US006999465B2

(12) United States Patent
McDonald et al.

(10) Patent No.: US 6,999,465 B2
(45) Date of Patent: Feb. 14, 2006

(54) METHODS FOR RELIABLY SENDING IP MULTICAST PACKETS TO MULTIPLE ENDPOINTS OF A LOCAL AREA NETWORK

(75) Inventors: Daniel J. McDonald, Cary, IL (US);
John W. Maher, Woodstock, IL (US);
David P. Helm, Carol Stream, IL (US);
Brian R. Poe, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 907 days.

(21) Appl. No.: 09/791,918

(22) Filed: Feb. 22, 2001

(65) Prior Publication Data

US 2002/0114302 A1 Aug. 22, 2002

(51) Int. Cl.
*H04J 3/26* (2006.01)
(52) U.S. Cl. .................................... 370/432; 370/338
(58) Field of Classification Search ................ 370/235, 370/236, 237, 392, 432, 475, 338
See application file for complete search history.

(56) References Cited

U.S. PATENT DOCUMENTS

| 6,269,080 B1 * | 7/2001 | Kumar ........................ 370/236 |
| 6,331,983 B1 * | 12/2001 | Haggerty et al. ............. 370/400 |
| 6,587,438 B1 * | 7/2003 | Brendel ....................... 370/238 |
| 6,683,850 B1 * | 1/2004 | Dunning et al. ............. 370/231 |
| 6,754,224 B1 * | 6/2004 | Murphy ....................... 370/432 |
| 6,785,274 B1 * | 8/2004 | Mahajan et al. ............. 370/390 |
| 2002/0075824 A1 * | 6/2002 | Willekes et al. .............. 370/329 |
| 2002/0150094 A1 * | 10/2002 | Cheng et al. ................ 370/389 |

* cited by examiner

*Primary Examiner*—Chi Pham
*Assistant Examiner*—Rhonda Murphy
(74) *Attorney, Agent, or Firm*—Steven R. Santema; Terri S. Hughes; Indira Saladi

(57) ABSTRACT

Methods are disclosed for determining a link Op from among a plurality of host devices on a LAN, for exchanging control messages between a communication server and one or more sites having a link Op and a listening Op and for the link Op and/or listening Op to detect and recover from missing packets in a sequence of IP packets received from the server. The link Op and listening Op join a control multicast group address to receive control messages from the server. The link Op establishes a reliable message transfer session with the server. Upon the link Op detecting a missing packet, the link Op may request that the communication server resend the packet. Upon the listening Op detecting a missing packet, the listening Op determines whether the link Op will request retransmission of the missing packet. If the link Op is determined to not request retransmission of the missing packet, the listening Op requests retransmission of the missing packet or accepts the packet as missing and processes an out-of-sequence packet. If the link Op is determined to request retransmission of the missing packet, the listening Op discards the packet and relies upon the link Op to request retransmission of the missing packet.

14 Claims, 6 Drawing Sheets

METHODS FOR RELIABLY SENDING IP MULTICAST PACKETS TO MULTIPLE ENDPOINTS OF A LOCAL AREA NETWORK

FIELD OF THE INVENTION

This invention relates generally to communication systems, and particularly communication systems incorporating reliable message using Multicast Internet Protocol (IP) addressing.

BACKGROUND OF THE INVENTION

Communication systems typically include a plurality of communication units, such as mobile or portable radio units and dispatch consoles that are geographically distributed among various repeater sites and console sites. The communication units wirelessly communicate with the repeater sites and each other, and are often logically divided into various subgroups or talkgroups. Communication systems may be organized as trunked systems, where a plurality of communication resources is allocated amongst multiple users or groups by assigning the repeaters within a radio frequency (RF) coverage area on a call-by-call basis, or as conventional (non-trunked) radio systems where communication resources are dedicated to one or more users or groups. In trunked systems, or in mixed trunked and conventional systems, there is usually provided a central controller/server (sometimes called a "zone controller") for allocating communication resources among multiple sites. The central controller may reside within a single device or multiple devices and may be located at a fixed equipment site or may be distributed among the repeater or console sites.

In recent years, communication systems have begun to use Internet Protocol (IP) to transport packet data between endpoints (or "hosts" in IP terminology). The data is divided into IP packets called datagrams, which include addressing information (e.g., source and destination addresses) that enables various routers forming an IP network to route the packets to the specified destination(s). The destination addresses may identify a particular host or may comprise an IP Multicast address shared by a group of hosts. Examples of communication systems using multicast addressing are described and claimed in U.S. Pat. No. 6,141,347, titled "Wireless Communication System Incorporating Multicast Addressing and Method For Use" and U.S. Pat. No. 6,647,020 titled "Methods for Implementing a Talkgroup Call in a Multicast IP Network," each of which is assigned to the assignee of the present invention and incorporated herein by reference in its entirety.

Oftentimes, multiple endpoints or hosts are attached on a local area network (LAN). For example, in a wide area trunking system that performs group call, there are typically two or more consoles attached on a LAN. It would be desirable for all participating endpoints on the LAN to reliably receive IP multicast packets that are routed to the LAN such as, for example, control messages from a zone controller for setting up a group call. Although known Automatic Repeat Request (ARQ) protocols may be employed to achieve reliable message transfer sessions between a sender and receiver (whereby the receiver may request the retransmission of data blocks that are either not received or received corrupted from the sender), the establishing of multiple ARQ sessions with multiple endpoints attached to a LAN is unwieldy and may impede system performance. Accordingly, to the extent that ARQ sessions may be used to establish reliable message transmissions between a server (e.g., zone controller) and multiple hosts (e.g., consoles) attached to a LAN, it would be desirable that ARQ sessions be established with less than all of the host devices (hereinafter termed "link Op(s)") attached to the LAN at a particular site. Generally, such a scheme ensures that IP multicast message(s) addressed from the server to an IP multicast destination address have reliably reached the link Op(s) and in most instances may be received by other host devices (hereinafter termed "listening Op(s)") attached to the LAN that have joined the multicast group address.

However, it is possible that packets may be dropped on the LAN such that, for example, a packet (e.g., packet #2) from the server reaches the link Op but is not received by a listening Op. This can cause the listening Op to "hang" indefinitely, discarding message #3, #4 and so forth as it awaits retransmission of packet #2, but such retransmission never occurs because the link Op, having successfully received packet #2 will not request retransmission of packet #2. It would be desirable for listening Ops to recover from incidents of lost packets without "hanging."

Accordingly, there is a need for a method for reliably sending IP multicast packets to multiple host devices attached to a LAN. Advantageously, the method allows for designating one or more of the hosts as link Ops and establishing a reliable message exchange session between a server (e.g., zone controller) and the link Op so as to ensure that IP multicast messages have reliably reached the LAN. In most instances, the messages will be received by all participating hosts on the LAN that have joined the appropriate multicast group address. However, in the event that packets are dropped on the LAN and thereby not received by certain host devices, there is a need for the affected hosts to reliably receive the lost packets. Further, there is a need that the affected hosts accommodate and recover from incidents of lost packets without "hanging" and, most preferably, without requiring retransmission of the lost packets from the server. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
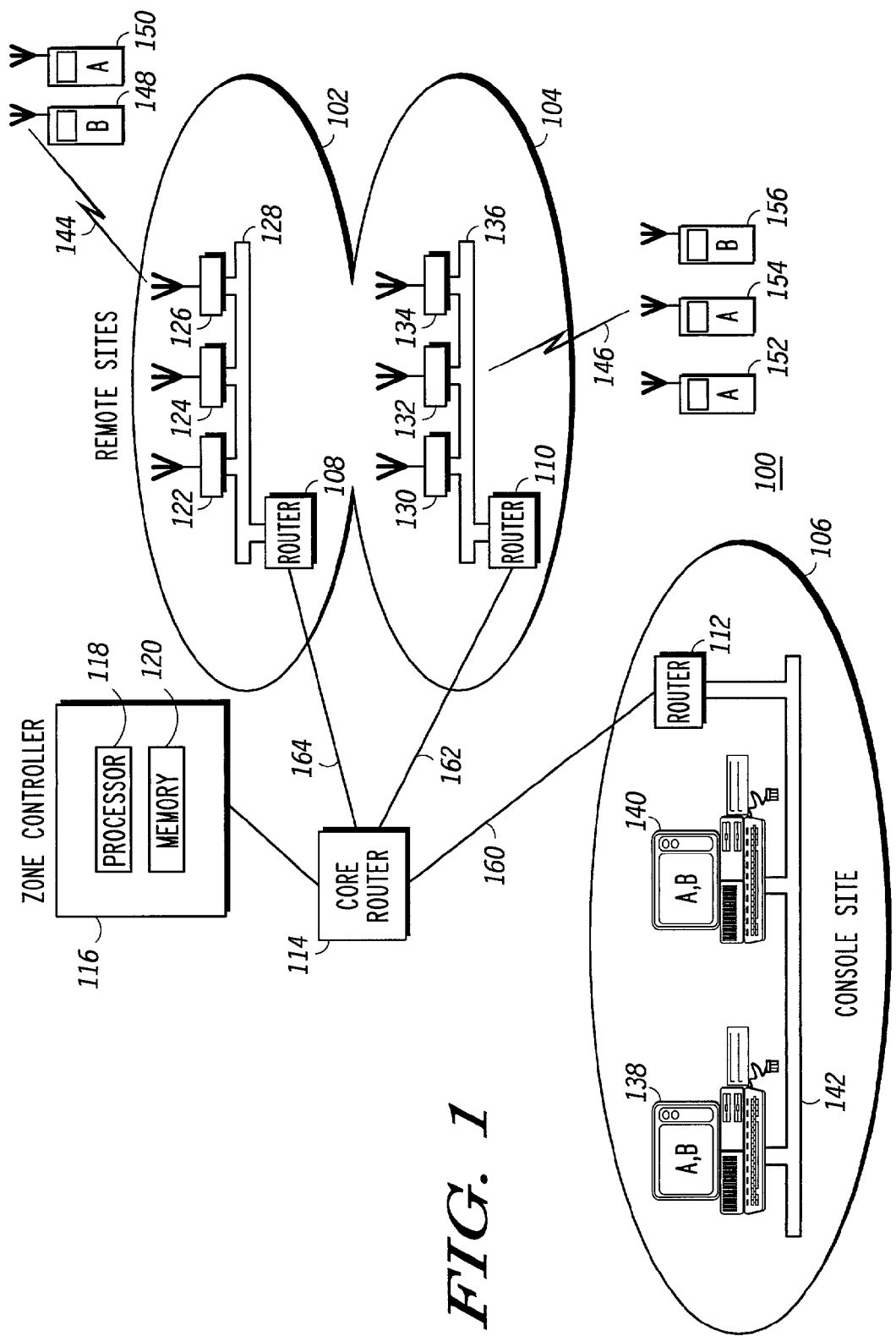
FIG. 1 is a block diagram of a communication system using IP multicast addressing according to the invention.

In one embodiment of the present invention, there is provided a method of determining a link Op from among a plurality of host devices on a LAN. The method comprises sending, from a first host of the plurality of hosts, via one or more network devices, a link up request message addressed to a communication server. In response, the communication server sends a link up acknowledgement message to the first host including a first control multicast group address. The first host then sends a link advertisement message including the first control multicast group address to at least a second host of the plurality of hosts.

In another embodiment of the present invention, there is provided a method of sending and receiving control messages between a communication server and a plurality of sites having one or more host devices attached to a LAN. The method comprises distributing different control multicast group addresses to each of the plurality of sites. The method further comprises sending, from the communication server, via one or more network devices, a sequence of IP packets addressed to the control multicast group addresses; and receiving by a number of participating host devices having joined the control multicast group addresses, the sequence of IP packets. A reliable message transfer session may be established at each site between the communication server and a designated link Op such that the link Op may request retransmission of missing packets, and such that messages from the site are communicated to the server via the link Op.

In still another embodiment of the present invention, there is provided a method of sending a sequence of IP packets from a communication server to at least one site having a link Op and one or more listening Ops. The method comprises the server generating a message comprising a packet of the sequence of IP packets, a sequence number of the packet, and a sequence number of a last acknowledged packet of the sequence of IP packets by the link Op. The message is sent by the server to the control multicast address of the at least one site.

In still yet another embodiment of the present invention, there is provided a method for a link Op and listening Op at a site to detect and recovering from missing packets in a sequence of packets received from a communication server. Upon a link Op detecting a missing packet, the link Op may request that the communication server resend the packet. Upon a listening Op detecting a missing packet, the listening Op determines whether the link Op will request retransmission of the missing packet. If the link Op is determined to not request retransmission of the missing packet, the listening Op requests retransmission of the missing packet or accepts the packet as missing and processes an out-of-sequence packet. If the link Op is determined to request retransmission of the missing packet, the listening Op discards the packet and relies upon the link Op to request retransmission of the missing packet.

Turning now to the drawings and referring initially to FIG. 1, there is shown an IP multicast communication system (or "network") 100 comprising a plurality of sites 102, 104, 106 that are logically coupled, via respective router elements 108, 110, 112 to a core router element 114. The router elements 108–114 are functional elements that may be embodied in separate physical routers or combinations of routers. Nevertheless, for convenience, the router elements will hereinafter be referred to as "routers." The core router 114 is sometimes referred to as the "Rendezvous Point" or "RP Router" because it is a rendezvous point of the multicast distribution tree between host devices at different sites. The core router 114 is coupled to a zone controller/server 116 having a processor 118 (such as a microprocessor, microcontroller, digital signal processor or combination of such devices) and a memory 120 (such as volatile or non-volatile digital storage devices or combination of such devices). In one embodiment of the present invention, the zone controller 116 manages and assigns IP multicast addresses for payload (voice, data, video, etc.) and control messages between and among the various sites 102, 104, 106.

As depicted in FIG. 1, site 102 includes a plurality of repeaters 122, 124, 126 that are coupled, via Ethernet 128 to an associated router 108. Similarly, site 104 includes a plurality of repeaters 130, 132, 134 that are coupled, via Ethernet 136 to router 110. Generally, the repeaters at the various sites 102, 104 communicate, via wireless communication resources 144, 146 with a plurality of communication units 148–156 (sometimes called "subscriber units") which may comprise mobile or portable wireless radio units. Suitable wireless communication resources 144, 146 are multiple RF (radio frequency) channels such as pairs of frequency carriers, time division multiple access (TDMA) slots, code division multiple access (CDMA) channels, or any other RF transmission media. Site 106 includes a plurality of dispatch consoles 138, 140 that are coupled via Ethernet 142 to router 112 and defines a "console" site. Consoles 138, 140 may comprise wireless or wireline consoles. Although not shown in FIG. 1, it will be appreciated that a single site may include both repeaters and console positions.

In one embodiment, the zone controller 116 assigns and manages IP multicast addresses for control messages and/or payload (voice, data, video, etc.) between and among communication devices participating in talkgroup or point-to-point calls at the various sites 102, 104, 106. The multicast group address(es) may be assigned statically or dynamically for particular talkgroups or communication devices.

Multipoint routes pertaining to the IP multicast addresses used in the present invention are maintained by the routers 108–114 forming the network 100. IP Multicast is based on the well-known Internet Group Management Protocol (IGMP) which allows a multicast router to track the existence of multicast group members on local networks coupled to that router. Additionally, multicast routers use the information provided by IGMP in conjunction with a multicast routing protocol to support forwarding of data across a network of routers. Given the nature of wireless communication systems, sparse mode protocols such as the Core Based Tree (CBT) protocol and the Protocol Independent Multicast-Sparse Mode (PIM-SM) protocol are preferred multicast routing protocols for use in the present invention. However, it is anticipated that dense mode protocols such as the Distance Vector Multicast Routing Protocol (DVMRP), the Multicast Open Shortest Path First (MOSPF) protocol, the Protocol Independent Multicast-Dense Mode (PIM-DM) protocol or other protocols that may be devised in the future may also be used to implement the present invention. A common feature of these multicast routing protocols is that each establishes a "spanning tree" which, for a given multicast group, defines all of the router interfaces which contain group members and the necessary routes between these interfaces to provide the multicast distribution with a minimum amount of data replication.

Figure 2:
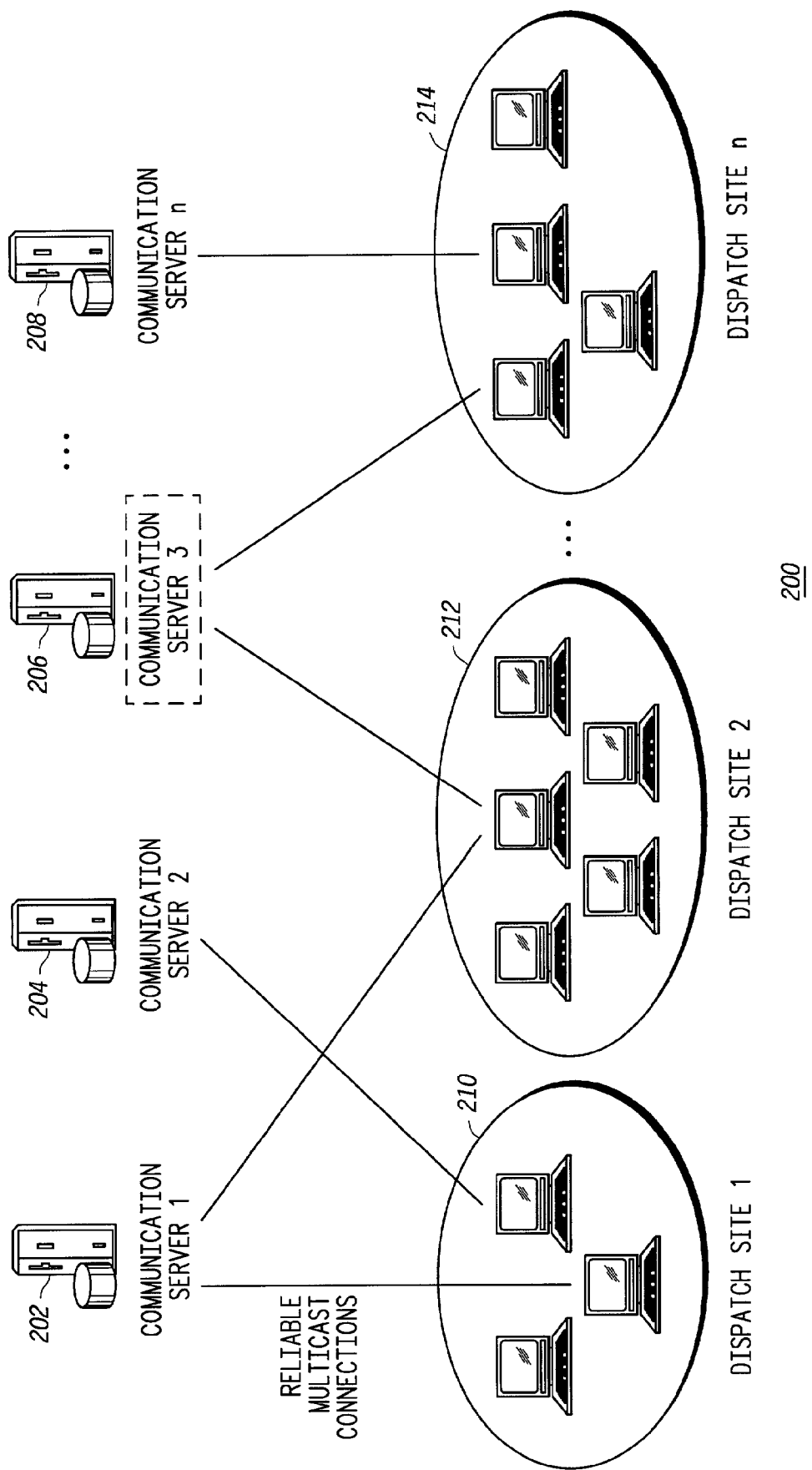
FIG. 2 shows an example communication system with multiple communication servers connected to dispatch consoles at different sites.

As will be appreciated, communication servers may be logically connected to host devices at multiple sites, including multiple console positions at different sites. Also, more than one server may be connected a particular site. FIG. 2 illustrates a communication system 200 having multiple servers connected to multiple sites. As shown, server 202 is connected to sites 210 and 212; server 204 is connected to site 210; server 206 is connected to sites 212 and 214, and server 208 is connected to site 214. The servers 202–208 may comprise, for example, any combination of zone controllers, conventional servers, telephony servers, etc. or generally any type of server presently known or devised in the future that is capable of sending and receiving IP datagrams with other host devices. In the embodiment of FIG. 2, the host devices comprise a plurality of console positions at sites 210–214. However, as will be appreciated, the present invention may be implemented with virtually any type or number of host devices located at any number of sites.

Generally, as best observed in FIG. 1, connections from a server to a host device are established by routers defining a packet-based wide-area network (WAN) and the host devices at each respective site are connected by local area network (LAN). In one embodiment, the various servers send different IP multicast group addresses to each participating site. Consequently, sites connected to multiple servers receive different multicast group addresses from each server. For example, server 202 ("Communication Server 1"), which serves both site 210 ("Dispatch Site 1") and site 212 ("Dispatch Site 2") may send a first multicast group address to site 210 and a second multicast group address to site 212. Additionally, server 204 ("Communication Server 2") may send a third multicast group address to site 210. Host devices desiring to receive IP packets from a particular server join the multicast group addresses associated with that server at their respective sites, by sending Internet Group Management Protocol (IGMP) "Join" messages to their local router(s). Based on the IGMP Join messages, the routers of the network build a spanning tree of router interfaces and necessary routes between those interfaces to support communication between the server and the participating devices at each site. In one embodiment, host devices may join any number of the multicast group addresses available at their respective sites. Thus, in the present example, consoles at site 210 may join the first multicast group address (if they desire to receive messages from server 202) and/or the third multicast group address (if they desire to receive messages from server 204).

Figure 3:
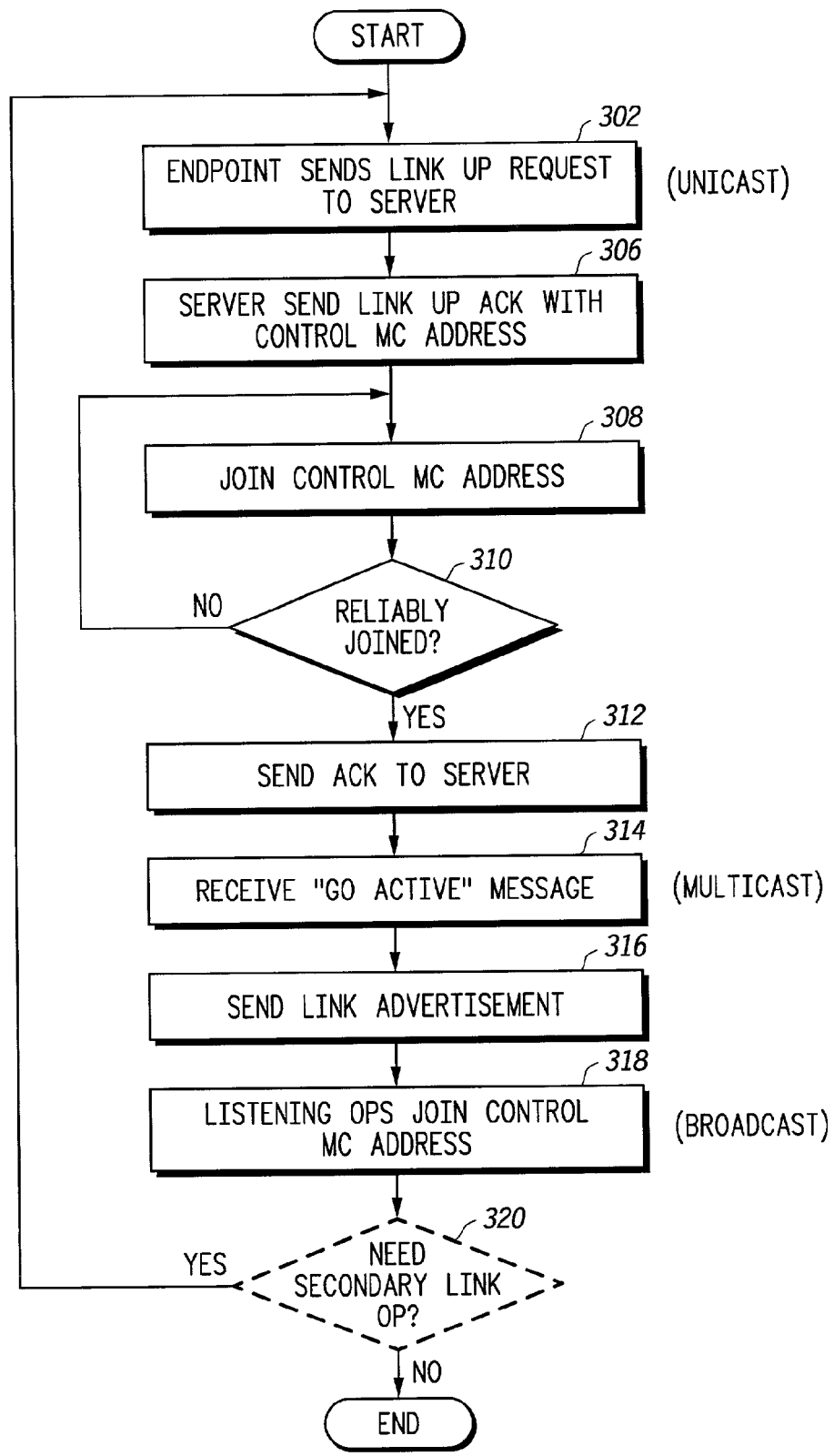
FIG. 3 is a flowchart showing a method for determining one or more link Ops from among multiple endpoints attached to a LAN.

Turning now to FIG. 3, there will be described various steps for establishing link Op console(s) from among multiple hosts attached to a LAN. In one embodiment, the steps of FIG. 3 are performed to establish a primary and a secondary link Op at each console site. Thus, in the event the primary link Op fails or goes out of service, communication may proceed via the secondary link Op. For example, with reference to FIG. 1, the steps of FIG. 3 may be performed to establish a primary and secondary link Op console from among the consoles 138, 140 at console site 106. At step 302, a first host sends a link up request message addressed to a communication server. For example, console 138 (FIG. 1) may send a link up request message to the zone controller 116. In one embodiment, the link up request message comprises an IP unicast message causing the routers of the network to deliver IP packets associated with the message to a specific destination address associated with the communication server.

At step 306, the server sends a link up acknowledgement message to the first host (e.g., console 138) having sent the link up request. In one embodiment, the link up acknowledgement message comprises an IP unicast message directed to a specific destination address associated with the first host and includes a first multicast group address to be used for control messages between the communication server and the first host and subsequently any other hosts at that site that desire to receive control messages from that server.

At step 308, the first host (e.g., console 138) attempts to join the multicast group address received at step 306 by sending an IGMP "Join" message to its local router (router 112 in the present example). The local router 112 sends PIM Join message(s) to the core router 114 to form the spanning tree of router interfaces logically connecting the zone controller 116 to console 138. For convenience, both IGMP and PIM Join messages will hereinafter be referred to as "Join" messages. Once the router interfaces are established, i.e, upon the first host having successfully joined the IP multicast group address, packets may be distributed by the router(s) of the network to the first host.

At step 310, the first host determines whether it is reliably joined to the multicast group address. Methods for achieving reliable Joins are described and claimed in U.S. patent application Ser. No. 09/728,359, assigned to the assignee of the present invention and incorporated herein by reference in its entirety. Generally, the determination of whether a receiving host (e.g., console 138) is reliably joined to a multicast group address involves a sourcing host (e.g., zone controller) sending one or more test packets, or "hello" packet(s) addressed to a multicast group address. If any of the test packets are received by the receiving host, it knows that it is reliably joined to the multicast group address. Otherwise, if it does not receive any packets within a certain period of time, it knows that its attempt to join the multicast group address was unsuccessful. If the first host is not reliably joined at step 310, it returns to step 308 to re-attempt to join the multicast group address received at step 306.

If the first host is reliably joined, it sends an acknowledgement (or "link up established") message to the communication server at step 312 indicating that it has successfully joined the first control multicast group address. In return, the communication server sends a "go active" message at step 314 instructing the first host to proceed as link Op. In one embodiment, the first host will proceed as the primary link Op in response to receiving the go active message. Then, at step 316, the first host sends a link advertisement message to other hosts ("listening Ops") on the LAN informing them that it is the primary link Op. In one embodiment, the link advertisement message comprises an IP broadcast message that may be received by any other host on the LAN and includes the first control multicast group address. Thus, continuing the present example, suppose the console 138, having sent a link up established message to the zone controller at step 312, receives a go active message at step 314. Thereafter, the console 138 broadcasts a link advertisement message informing console 140 that it (console 138) is the primary link Op and further informing console 140 of the first control multicast group address. Console 140 thus defines a listening Op with respect to the first control multicast group address.

At step 318, upon receiving the link advertisement message, listening Ops desiring to receive control messages from the communication server join the first control multicast group address so as to be eligible to receive packets addressed to the first control multicast group address. Thus, for example, console 140 may join the first control multicast group address to receive control messages from the zone controller 116.

At step 320, it is determined whether a secondary link Op is needed. If a secondary link Op is needed or desired, the process returns to step 302 to begin the process of establishing a secondary link Op. In one embodiment, the secondary link Op comprises a different host than the primary link Op. Thus, for example, if console 138 is the primary link Op, console 140 may become the secondary link Op. In such case, at step 316, console 140 sends a link advertisement message to console 138 informing console 138 that it (console 140) is the secondary link Op. Console 138 thus defines a listening Op with respect to the second control multicast group address. Alternatively, the same device (e.g., console 138) may operate as both primary and secondary link Op. In a preferred embodiment, the multicast group address received at step 306 by the secondary link Op (the second multicast group address) is different from the control multicast group address received by the primary link Op (the first multicast group address). Thus, the second multicast group address becomes a "backup" to the first multicast group address.

Figure 4:
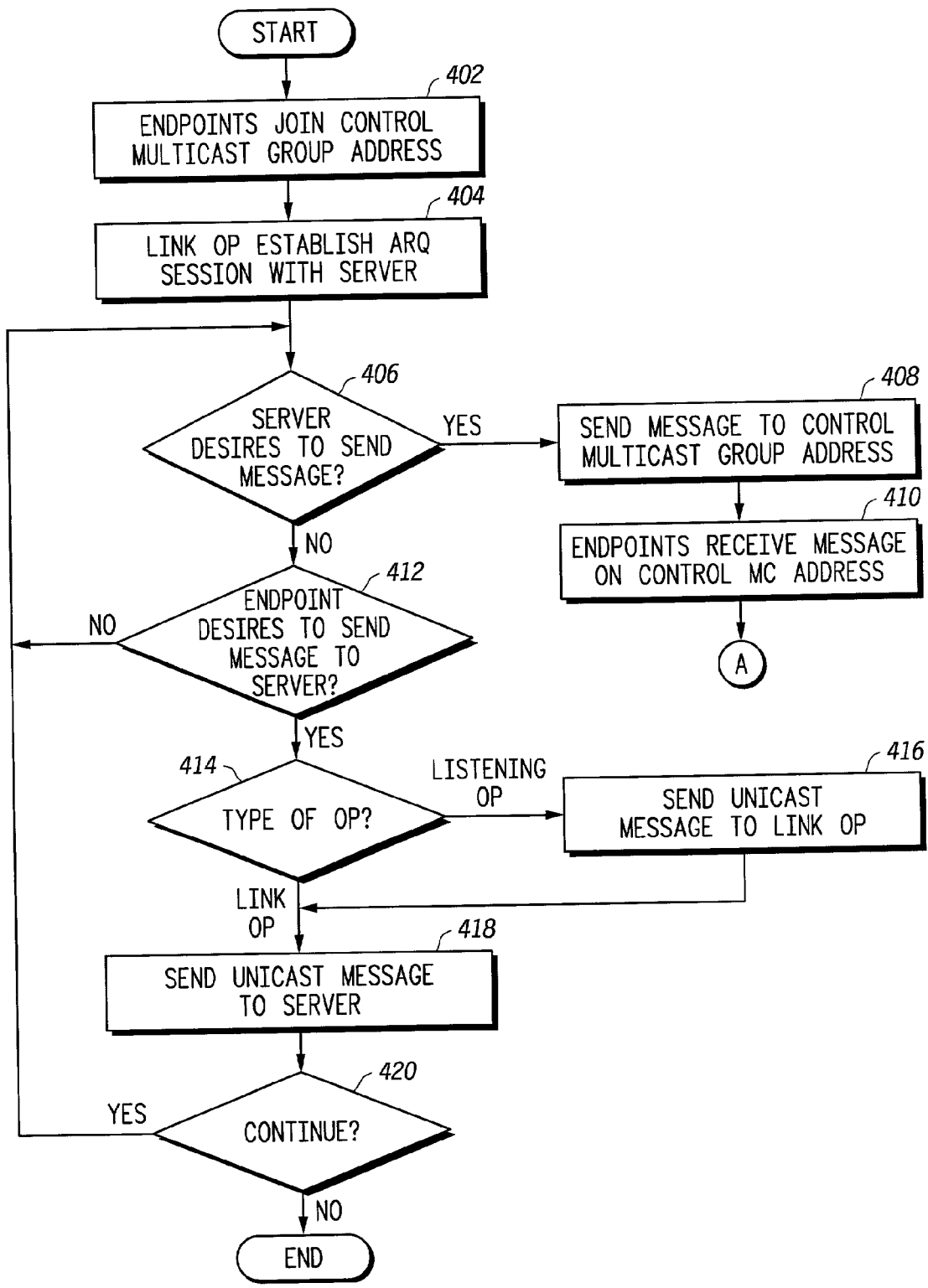
FIG. 4 is a flowchart showing a method for reliably exchanging control messages between a server and multiple endpoints attached to a LAN.

Now turning to FIG. 4, there will be described various steps for reliably exchanging control messages between a communication server and multiple hosts, including a link Op and one or more listening Ops attached to a LAN. At step 402, participating hosts (e.g., consoles) at each site join a control multicast group address. Where a server is connected to multiple sites, as described in relation to FIG. 2, the server sends a different multicast group address to each site. Similarly, where a site is served by multiple servers, they receive different multicast group addresses from each server. In one embodiment, the respective control multicast group addresses are sent from the zone controller to the link Op of each site in an IP unicast link up acknowledgment message, and sent from the link Op to various listening Ops at each site in an IP broadcast link advertisement message. The link Op and listening Ops at each site join the control multicast group address by sending IGMP "Join" messages to their local router. In turn, the routers of the network to form the spanning tree of router interfaces logically connecting the link Op ad listening Ops to the communication server(s). For convenience, the remaining description of FIG. 4 will presume a single communication server exchanging messages with a single site having a link Op and one or more listening Ops (e.g., zone controller 116 exchanging messages with console site 106, comprising link Op 138 and listening Op 140). However, it will be appreciated that the process of FIG. 4 may be duplicated for multiple servers and/or multiple sites. Moreover, the process may be duplicated for both primary and secondary link Ops.

At step 404, the link Op establishes an ARQ session with the communication server. Generally, the ARQ session defines a reliable message transfer session that enables the link Op to request retransmission of missing packets or packets received in error. Thus, once an ARQ session is established, the communication server may reliably send messages to the link Op, and vice versa. The type of ARQ protocol used is an implementation decision and is not a part of the present invention. Thus, virtually any ARQ may be used, including ARQ protocols presently known or devised in the future. In one embodiment, ARQ session is established only by the link Op(s) at each site and not by the listening Ops, so as to reduce system complexity and improve system performance.

If the communication server desires to send a message (step 406) to the link Op and/or listening Ops, it sends the message at step 408 ("a Send ARQ message") to the control multicast group address that the link Op and listening Ops have joined at step 402. The structure of one embodiment of the Send ARQ message will be described in relation to FIG. 5. All of the endpoints having successfully joined the control multicast group at step 402 receive the message at step 410.

If an endpoint (i.e., link Op or listening Op) desires to send a message (step 412) to the communication server, the process varies depending on the type of Op (step 414). Listening Ops send the message to the Link Op at step 416 and the Link Op forwards the message to the communication server at step 418. Messages from Link Ops are sent directly to the communication server at step 418. Thus, in one way or another, all messages from the site are sent to the communication server via the link Op.

In one embodiment, the messages from the Listening Ops to the Link Op are sent, via the LAN, using an IP unicast address and messages from the Link Op to the communication server are sent, via the routers of the network (WAN), using an IP unicast address.

As has been described, endpoints desiring to receive control messages from the communication server join a control multicast group address. Control messages are routed, via the WAN, from the communication server (e.g., zone controller 116) to a local site router (e.g., router 112 of console site 106). Messages are communicated, via the LAN (e.g., LAN 142), from the local router to the participating hosts (e.g., console 138, 140) having joined the control multicast group address. The participating endpoints include a link Op (e.g., console 138) having established a reliable message transfer session with the communication server, and one or more listening Ops (e.g., console 140) that have not established a reliable message transfer session with the server.

Figure 5:
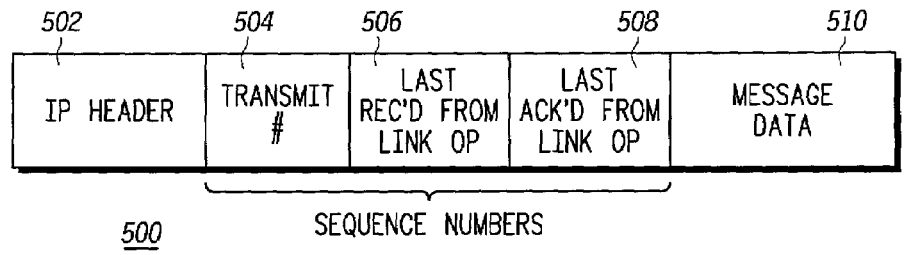
FIG. 5 shows the structure of a message sent from a communication server to a link Op according to the present invention.

FIG. 5 shows the structure of an example message 500 sent from the communication server to the link Op, via the control multicast group address. It is contemplated that the communication server will send a sequence of messages 500 to the link Op, which messages are eligible to be received by the link Op and listening Ops having joined the multicast group address. Each message 500 comprises an IP header 502, a transmit sequence number field 504, a "last received" sequence number field 506, a "last acknowledged" sequence number field 508 and a message data field 510. The IP header 502 includes source and destination IP addresses, as is well known in the art. The transmit sequence number field 504 identifies the sequence number of a packet that is presently being transmitted. The last received sequence number field 506 identifies the sequence number of a packet last received from the link Op. The last acknowledged sequence number field 508 identifies the sequence number of a most recent packet that is acknowledged (i.e., indicated as being received) by the link Op. The message data field 510 includes the packet(s) being transmitted which may include, for example, control message data.

Figure 6:
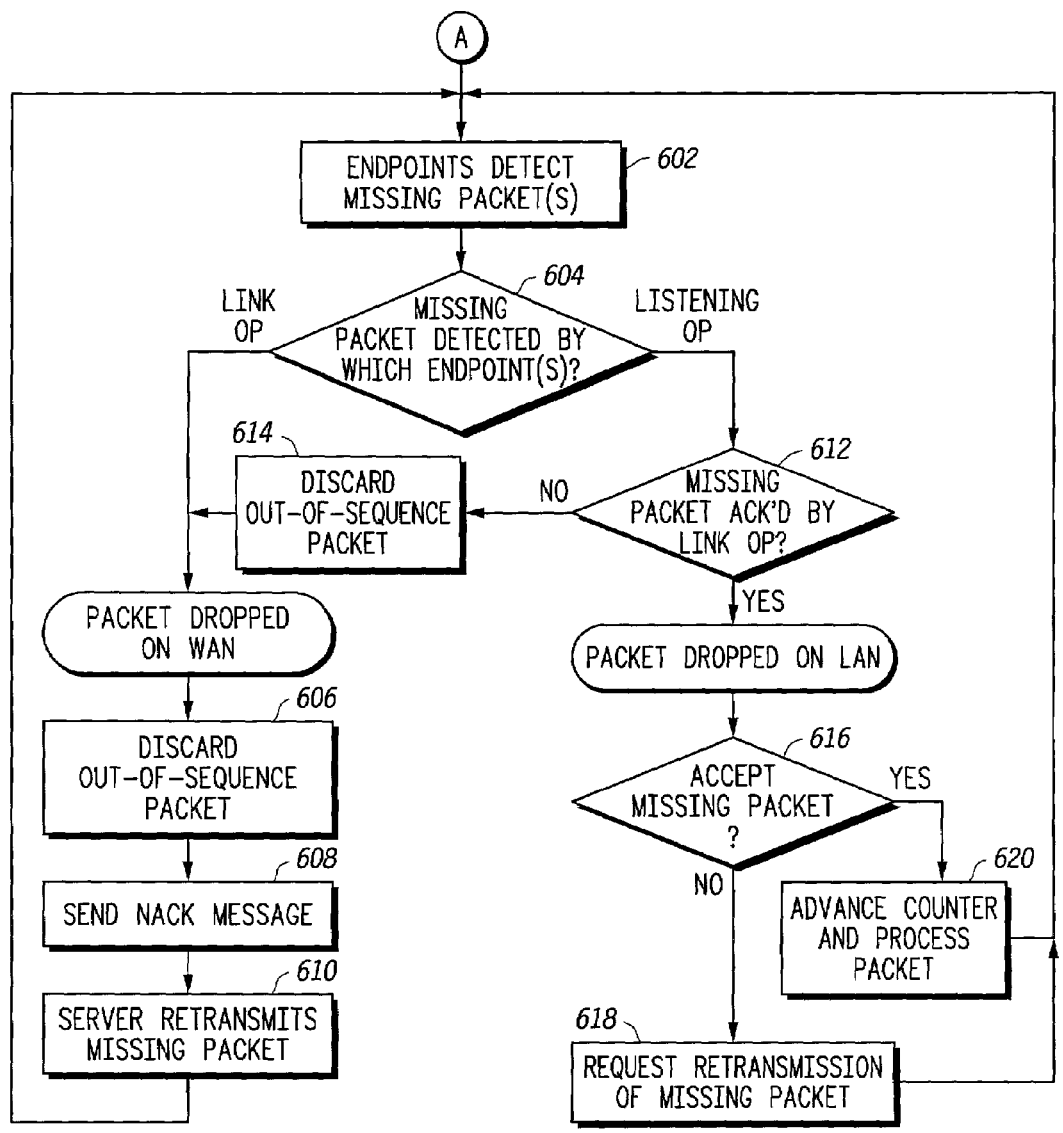
FIG. 6 is a flowchart showing steps for the link Op and listening Op to reliably receive messages from a server.

FIG. 6 shows various steps for the link Op and the listening Op to reliably receive message(s) 500 from the communication server. After having received a message 500 on the control multicast group address (step 410, FIG. 4), the endpoints detect at step 602 whether any packets that should have been received are missing. This may be accomplished by maintaining a counter of packet(s) last received from the server and comparing the sequence number of the last received packet to the sequence number of the presently received packet. If the presently received packet is out of sequence with the last received packet, the receiving link Op and/or listening Op may conclude that there are missing packet(s). Thus, for example, if a receiver receives packet 5 after having last received packet 3, it will conclude that packet 4 is missing because it knows that packet 4 should have been received before packet 5.

If a missing packet is detected by a link Op (step 604), that means that the missing packets were dropped somewhere by the routers of the network (WAN) before reaching the LAN. In such case, the link Op discards the presently received, out-of-sequence packet at step 606 and sends a negative acknowledgement (NACK) message to the server at step 608. In one embodiment, the NACK message identifies the sequence number of the packet last received (in sequence) by the link Op. Thus, in effect, the NACK message comprises a request for retransmission of missing packets that enables the server to determine which packet(s) were not received by the link Op. The server retransmits any missing packets at step 610 and continues transmitting, in sequence, any further packets. Thus, for example, if the link Op upon receiving packet 5 concludes that packet 4 is missing, it will discard packet 5 and send a NACK message to the server indicating that packet 3 is its last received packet. The server, in turn, will retransmit packets 4 and 5 and then proceed transmitting any further packets in the sequence.

If a missing packet is detected by a listening Op (step 604), it is possible that the missing packet was dropped on the LAN such that, for example, the packet was received by the link Op but not by the listening Op. However, it is also possible that the missing packet was dropped on the WAN, in which case the link Op will have detected the missing packet at step 604 and sent a negative acknowledgement at step 608, causing the server to resend the missing packets at step 610. According to principles of the present invention, the listening Op is able to distinguish between these two events such that in the former event, the listening Op may either accept that packets were lost and move up its counter (so that it may process packets received out of sequence) or, alternatively, to request retransmission of the missing packet(s). In either case, the listening Op will not continue to "hang" indefinitely (i.e., discarding packets received out of sequence while it passively waits for the missing packets to be retransmitted). In the latter event, if it is determined that packets are dropped on the WAN, the listening Op knows that the link Op will request or has requested retransmission of the missing packet(s).

At step 612, the listening Op determines whether a missing packet was acknowledged by the link Op and thereby will not be requested to be retransmitted by the link Op. This is accomplished by the listening Op comparing the sequence number of the missing packet to the sequence number of the packet last acknowledged by the link Op, identified in field 508 (FIG. 5). If the missing packet was acknowledged by the link Op, the listening Op may conclude that the missing packet was dropped on the LAN after having been received by the link Op and will not be requested to be retransmitted by the link Op. In other words, the listening Op would be out of sync with the link Op. If this occurs, in one embodiment, the listening Op accept that the missing packet is lost (step 616), advances its counter and processes the packet received out-of-sequence at step 620. Of course, the listening Op may then continue to process any subsequently received packets. Alternatively, if the listening Op does not desire to accept the missing packet as lost, it may request retransmission of the missing packet at step 618. In one embodiment, the link Op maintains a buffer of recently received packets and step 618 comprises the listening Op requesting retransmission of the packet from the link Op. In such event, the link Op retrieves the missing packet from its buffer and sends the packet to the listening Op, via the LAN. As will be appreciated, the listening Op might also request retransmission of the packet from the communication server if WAN traffic is not a concern.

If at step 612 the listening Op determines that the missing packet was not acknowledged by the link Op, the listening Op may conclude that the missing packet was dropped on the WAN and was (or will be) detected by the link Op. In such case, the listening Op discards the out-of-sequence packet at step 614 and depends on the link Op to request retransmission of the missing packet. The listening Op will receive the missing packet once it is successfully retransmitted by the server.

Figure 7:
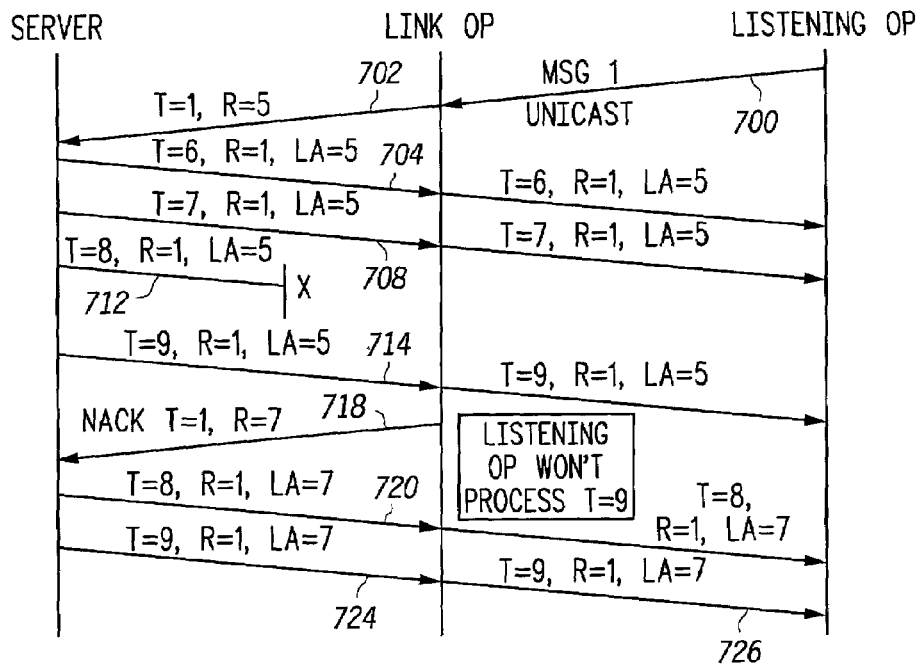
FIG. 7 is a message sequence chart illustrating an example of a link Op and listening Op recovering from a missing packet dropped on a WAN.

FIG. 7 is a message sequence chart illustrating an example of a link Op and listening Op recovering from a missing packet dropped on a WAN. The sequence presumes that the link Op and listening Op are joined to an IP multicast address and that messages from the server are addressed to the IP multicast address. Messages from the listening Op to the link Op, and from the link Op to the server, are IP unicast messages. The message sequence of FIG. 7 begins with the listening Op sending a first message 700 to the link Op. The link Op forwards the message to the server, yielding a forwarded message 702. The notation T=1, R=5 on the forwarded message 702 indicates a transit sequence number 1 and last received sequence number 5 (each relative to the link Op).

The server sends messages 704 and 708 to the link Op, which messages are successfully received by both the link Op and the listening Op. The notation T=6, R=1, LA=5 on message 704 indicates a transmit sequence number 6, a last received sequence number 1 (each relative to the server) and a last acknowledged sequence number 5 (indicating that the link Op has previously acknowledged receipt of packet 5). Similarly, the notation T=7, R=1, LA=5 on message 708 indicates a transit sequence number 7, a last received sequence number 1 and a last acknowledged sequence number 5.

Next, the server sends messages 712 (T=8, R=1, LA=5) and 714 (T=9, R=1, LA=5) to the link Op, but message 712 is dropped on the WAN and not received. Message 714, containing packet sequence number 9, is received by both the link Op and listening Op. The link Op and listening Op discard packet 9 as being out-of-sequence. The link Op sends a negative acknowledgement message 718 to the server indicating that its last received packet is 7. In response, the server sends messages 720 (T=8, R=1, LA=7) and 724 (T=9, R=1, LA=7), thereby retransmitting the missing packet 8 and the formerly out-of-sequence packet 9. Messages 720, 724 are successfully received by both the link Op and listening Op.

Figure 8:
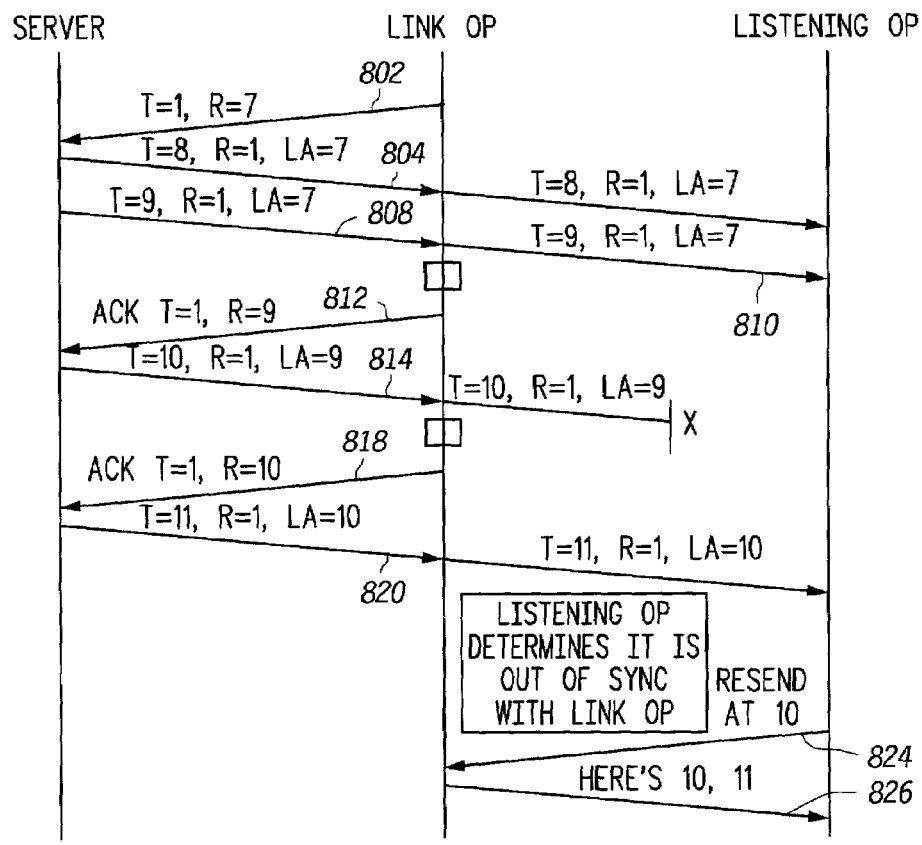
FIG. 8 is a message sequence chart illustrating an example of a listening Op recovering from a missing packet dropped on a LAN.

FIG. 8 is a message sequence chart illustrating an example of a listening Op recovering from a missing packet dropped on a LAN. Like FIG. 7, the sequence presumes that the link Op and listening Op are joined to an IP multicast address and that messages from the server are addressed to the IP multicast address. Messages from the listening Op to the link Op, and from the link Op to the server, are IP unicast messages. The message sequence of FIG. 8 begins with the link Op sending a message 802 (T=1, R=7) to the server.

The server sends messages 804 (T=8, R=1, LA=7) and 808 (T=9, R=1, LA=7) to the link Op, which messages are successfully received by both the link Op and the listening Op. The link Op sends an acknowledgement message 812 informing the server that it has successfully received packet 9. Next, the server sends a message 814 (T=10, R=1, LA=9) to the link Op, which message is successfully received by the link Op but is dropped on the LAN and not received by the listening Op. The link Op sends an acknowledgement message 818 informing the server that it has successfully received packet 10. The server sends the next message 820 (T=11, R=1, LA=10) to the link Op, which message is successfully received by the link Op and the listening Op. The link Op, having received packet 10, processes packet 11. The listening Op discards packet 11 as being out-of-sequence because its last received packet is 9 and it is expecting packet 10. The listening Op recognizes that it is out of sync with the link Op (i.e., that the link Op has already received packet 10) because message 820 indicates packet 10 was acknowledged by the link Op. The listening Op sends message 824 to the link Op, requesting the link Op to retransmit the missing packet 10 and the out-of-sequence packet 11. The link Op sends message 826 to the listening Op including packets 10 and 11.

Alternatively, upon the listening Op determining that it is out of sync with the link Op, the listening Op may process packet out-of-sequence packet 11 without requesting retransmission of packets 10 and 11 and move up its counter accordingly.

The present disclosure therefore has identified a method for reliably sending IP multicast packets to multiple host devices attached to a LAN. The method takes advantage of advances in reliable LAN implementations to remove the necessity and complexity of multiple endpoints on the LAN having to establish a reliable message exchange sequence with a server, in favor of establishing a reliable message exchange sequence with a link Op at each site. The disclosure identifies methods for the link Op and listening Op to detect missing packets and for listening Ops to recover from incidents of missing packets without hanging and without requiring retransmission of the lost packets from the server.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a packet network communication system including a plurality of host devices on a LAN, a method comprising:
   sending, from a first host of the plurality of hosts, via one or more network devices, a link up request message addressed to a communication server;
   sending, from the communication server to the first host, via one or more network devices, a link up acknowledgement message including a first control multicast group address;
   sending, from the first host to at least a second host of the plurality of hosts, a link advertisement message including the first control multicast group address.

2. The method of claim 1, wherein the link advertisement message identifies the first host as a primary link Op.

3. The method of claim 1, wherein the link advertisement message is addressed to an IP broadcast address.

4. The method of claim 3, further comprising:
   receiving, by the at least a second host, the link advertisement message including the first control multicast group address; and
   joining, by the at least a second host, the first control multicast group address so as to be eligible to receive packets addressed to the first control multicast group address.

5. The method of claim 1, further comprising:
   sending, from the communication server to the first host, via one or more network devices, one or more packets addressed to the first control multicast group address;
   issuing, by the first host, a join command to the one or more network devices in an attempt to join the first control multicast group address;
   if any packers are received by the first host,
      sending, from the first host to the communication server, a link up established message indicating that the first host is joined to the first control multicast group address; and
      sending, from the communication server to the first host, a go active message instructing the first host to proceed as link Op, the step of sending a link advertisement message being accomplished by the first host in response to receiving the go active message.

6. The method of claim 1, further comprising:
   sending, from the communication server to a second host, via one or more network devices, a second control multicast group address;
   sending, from the second host to at least the first host of the plurality of hosts, a link advertisement message including the second control multicast group address.

7. The method of claim 6, wherein the link advertisement message identifies the second host as a secondary link Op.

8. The method of claim 1, further comprising:
   sending, from the communication server to the first host, via one or more network devices, a second control multicast group address;
   sending, from the first host to at least a second host of the plurality of hosts, a link advertisement message including the second control multicast group address, the second control multicast group address comprising a backup to the first control multicast group address.

9. The method of claim 1, wherein the communication server comprises a zone controller and the plurality of host devices comprise a plurality of dispatch consoles.

10. A method comprising:
    distributing control multicast group addresses to each of a plurality of sites having one or more host devices attached to a LAN;
    sending, from a communication server, via one or more network devices, a sequence of IP packets addressed to the control multicast group addresses; and
    receiving by a number of participating host devices having joined the control multicast group addresses, the sequence of IP packets,
    wherein in one or more sites of the plurality of sites,
       establishing a reliable message transfer session between the communication server and a first host; and
       sending, via the LAN, a message from a second host to the first host, and forwarding the message to the communication server, via the first host.

11. The method of claim 10, wherein the step of distributing control multicast group addresses comprises, sending, from the communication server, different control multicast group addresses to each site of the plurality of sites.

12. A method comprising:
    distributing control multicast group addresses to each of a plurality of sites having one or more host devices attached to a LAN;

sending, from a communication server, via one or more network devices, a sequence of IP packets addressed to the control multicast group addresses further comprising
- (i) generating, by the communication server, a first message comprising a packet of the sequence of IP packets, a sequence number of the packet, and a sequence number of a last acknowledged packet of the sequence of IP packets, wherein the last acknowledged packet defines a most recent packet that is indicated as received by a link Op of the at least one site; and
- (ii) sending the first message to the control multicast address of at least one site;

receiving by a number of participating host devices having joined the control multicast group addresses, the sequence of IP packets;

receiving, by a participating host at the at least one site, the first message;

determining, by the participating host, whether the packet of the first message is out at sequence with a packet last received by the participating host; and if the packet is determined to be out of sequence with a packet last received by the participating host,
- (i) identifying one or more missing packets expected to be received by the participating host between the packet last received and the packet of the first message;
- (ii) determining whether the link Op will request retransmission of the missing packets from the communication server; and
- (iii) if the link Op is determined to not request retransmission of the missing packets from the communication server, then performing at least one of a) processing the packet of the first message and b) requesting from the link Op a retransmission of the missing packets.

13. The method of claim 12, comprising:

receiving, by the link Op at the at least one site, the first message;

determining, by the link Op, whether the packet of the first message is out of sequence with a packet last received by the link Op; and if the packet is determined to be our of sequence with the packet last received by the link Op, negatively acknowledging the packet, thereby causing the communication server to resend the packet to the at least one site.

14. The method of claim 12, further, comprising if the link Op is determined to request retransmission of the missing packets from the communication server, discarding the packet of the first message by the participating host; and await retransmission of the missing packets.

* * * * *

UNITED STATES PATENT AND TRADEMARK OFFICE
CERTIFICATE OF CORRECTION

| | |
|---|---|
| PATENT NO. | : 6,999,465 B2 |
| APPLICATION NO. | : 09/791918 |
| DATED | : February 14, 2006 |
| INVENTOR(S) | : McDonald et al. |

It is certified that error appears in the above-identified patent and that said Letters Patent is hereby corrected as shown below:

Column 12, line 61, change "comprises," to --comprises--

Column 13, line 21, change "at" to --of--

Column 13, line 16, change "our" to --out--

Signed and Sealed this

Twenty-first Day of November, 2006

JON W. DUDAS
*Director of the United States Patent and Trademark Office*